Nov. 7, 1933.    G. W. FOUKE    1,934,181
TIRE GROOVING TOOL
Filed March 30, 1932
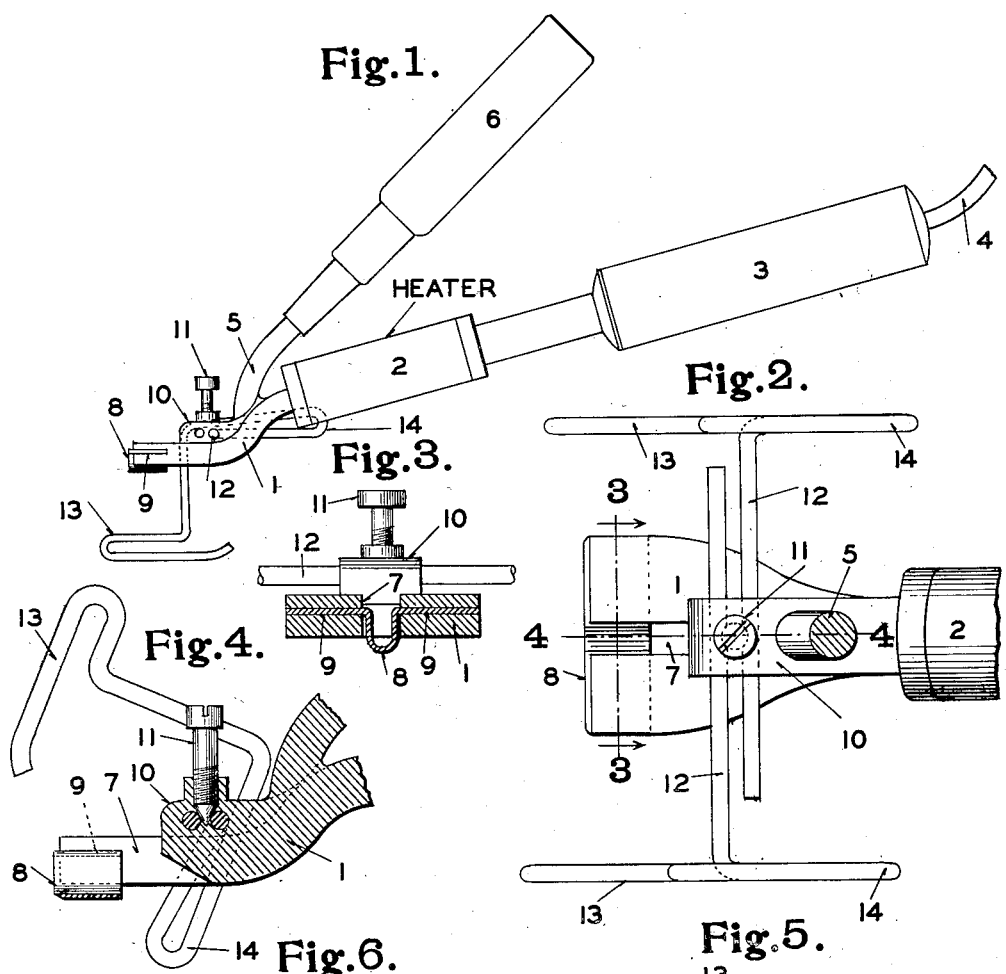
Inventor
Geo. W. Fouke
By [signature]
Att'y.

Patented Nov. 7, 1933

1,934,181

UNITED STATES PATENT OFFICE 1,934,181

TIRE GROOVING TOOL

George W. Fouke, St. Louis, Mo., assignor, by mesne assignments, to Kwick-Kut Manufacturing Co., Inc., St. Louis, Mo., a corporation of Missouri Application March 30, 1932. Serial No. 601,955

5 Claims. (Cl. 30—9)

My invention relates to a tire grooving tool and particularly to a tool by the use of which circumferential and cross grooves may be cut in the tread of a tire after it has been worn smooth by use, to restore its non-skid properties. Heretofore, owing to the difficulty of cutting rubber, tires, after the treads have been worn smooth are either discarded or the grooving of the tread has been restored by grinding or by cutting while water is applied to the tread to reduce the resistance of the cutting tool. The former of these methods is slow and expensive, and the latter only slightly reduces the resistance of the tool so that the operation is difficult and unsatisfactory. I have found that by heating a cutting knife and providing suitable guiding means, the re-grooving operation may be performed easily and rapidly by a simple hand-tool.

In the accompanying drawing, which illustrates one form of tool made in accordance with my invention, Figure 1 is a side elevation with one of the guide members removed; Figure 2 is a top plan view, on an enlarged scale, of the front end of the tool with both guide members in position; Figure 3 is a section taken on the line 3—3 of Figure 2; Figure 4 is a section taken on the line 4—4 of Figure 2; Figure 5 is a top plan view of a portion of a tire showing the method of applying the tool thereto to cut the circumferential grooves; and Figure 6 is a view similar to Figure 5 but showing the method of cutting cross grooves.

The cutter holder 1 is made of copper, brass or other good heat-conducting material. It is carried in the end of an electrical heating element 2 by means of which its temperature is raised to the desired degree. A handle 3 of wood or other heat insulating material is connected to the rear end of the heating element which is supplied with current by a flexible conductor 4 extending longitudinally through the handle. Formed on the upper face of the holder 1 is a tang 5 to which is secured an auxiliary handle 6 also preferably of wood. The handle 6 is positioned at a convenient angle to the handle 3 so that the operator may force the cutter holder firmly against the tire with one hand while it is moved forward by the other grasping the handle 3.

Formed in the forward end of the holder is a vertical slot 7 to receive the central U-shaped cutting portion of a blade 8, the ends of which extend into horizontal slots 9 in which they fit snugly so that the cutter is held in place by friction. This enables the blade to be quickly replaced by another in case the blade becomes worn or a different depth or width of groove is desired. This construction also insures the proper transfer of heat from the holder to the blade.

On the upper face of the holder is a projection 10 provided with a pair of transverse openings for the reception of the guides which are secured in position by a set screw 11. The guides, which are preferably formed of wire, each comprises a stem 12, to enter one of the openings in the projection 10, a side engaging portion 13, and a groove engaging loop 14.

In using my tool, the circumferential grooves are first cut in the manner shown in Figure 5, and then the cross grooves are cut as shown in Figure 6. When cutting the first circumferential grooves both guides are used and are turned in the position shown in Figure 1 so that the parts 13 of the guide contact with the sides of the tire, as shown in Figure 5. The first groove cut is preferably the central groove 16. After this groove is cut, the side groove 17 may be cut in the same manner or one of the guides removed and the other turned so that the loop 14 will engage with the groove 16 to provide a guide while cutting the groove 17. In cutting the cross grooves the first groove is laid out and cut without the use of the guides, after which a single guide is used, each groove being engaged by the loop 14 to provide guiding means for cutting the succeeding groove. The cross grooves 18, having left hand inclinations, are cut by means of the right hand guide, as shown in Figure 6, while the grooves 19 (shown by broken lines) having right hand inclinations, require the use of the left hand guide.

Having fully described my invention, what I claim as new and desire to secure by Letters Patent of the United States is:

1. In a device of the class described, the combination with a heating element, of a cutter holder carried thereby, a grooving blade carried by said holder and projecting below the lower face thereof, a handle for propelling said blade, and a pair of adjustable guides projecting laterally from said holder and extending downwardly into position to engage the sides of a tire.

2. In a device of the class described, the combination with a heating element, of a cutter holder carried thereby, a grooving blade carried by said holder and projecting below the lower face thereof, a handle for propelling said blade, and a pair of adjustable guides projecting laterally from said holder and extending downwardly into position to engage the sides of a tire, each of said guides being provided with a portion adapted to be positioned substantially in the plane of the blade to engage with a pre-formed groove when the position of the guide is shifted.

3. In a device of the class described, the combination with a heating element, of a cutter holder carried thereby, and a guide, said guide comprising a stem longitudinally and rotatably adjustable in said holder and a plurality of engaging means adapted to be brought into operation by the rotation of said stem.

4. In a device of the class described, the combination with a heating element, of a cutter holder of heat conducting material carried thereby, said holder being provided with a vertical slot and a pair of horizontal slots extending laterally therefrom to the sides of the holder, a blade having a loop-shaped cutting portion extending downwardly through the vertical slot, and a pair of ends extending laterally from the cutting portion and positioned in said horizontal slots to make intimate contact with both the upper and lower faces thereof throughout substantially the entire width of the holder, whereby heat conducting means is provided between the blade and the holder.

5. In a device of the class described, the combination with a cutter holder, of a cutting blade carried thereby, a handle for propelling said holder, a guiding element projecting laterally from the holder and extending downwardly a substantial distance below the cutter to cooperate with the side of a tire, and a second guiding element adapted to be positioned laterally of the blade and approximately in the plane thereof to engage with a pre-formed groove in the tire.

GEORGE W. FOUKE.